United States Patent
Zhu et al.

(10) Patent No.: US 10,870,413 B2
(45) Date of Patent: Dec. 22, 2020

(54) SIGNAL DIRECTION DETECTION BASED VEHICLE REMOTE ENTRY CONTROL METHOD AND DEVICE

(71) Applicant: KABUSHIKI KAISHA TOSHIBA, Minato-ku (JP)

(72) Inventors: Ziming Zhu, Bristol (GB); Zubeir Bocus, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/363,416

(22) Filed: Mar. 25, 2019

(65) Prior Publication Data

US 2020/0307518 A1 Oct. 1, 2020

(51) Int. Cl.
*B60R 25/24* (2013.01)
*G01S 5/02* (2010.01)
*G01S 5/08* (2006.01)

(52) U.S. Cl.
CPC .......... *B60R 25/245* (2013.01); *G01S 5/0221* (2013.01); *G01S 5/08* (2013.01); *B60R 2325/205* (2013.01)

(58) Field of Classification Search
CPC ............. B60R 25/245; B60R 2325/205; G01S 5/0221; G01S 5/08
See application file for complete search history.

(56) References Cited

U.S. PATENT DOCUMENTS

| | | | |
|---|---|---|---|
| 2006/0007036 A1* | 1/2006 | Natsume | G01S 3/74 342/70 |
| 2016/0063247 A1* | 3/2016 | Farjon | G06F 21/562 726/23 |
| 2017/0158169 A1* | 6/2017 | Luo | B60R 25/245 |
| 2018/0290624 A1* | 10/2018 | Wagatha | G07C 9/00309 |
| 2020/0014099 A1* | 1/2020 | Ghabra | G01S 13/74 |

FOREIGN PATENT DOCUMENTS

| | | |
|---|---|---|
| CN | 104717642 A | 6/2015 |
| KR | 10-1783151 B1 | 9/2017 |

* cited by examiner

*Primary Examiner* — Nabil H Syed

(74) *Attorney, Agent, or Firm* — Oblon, McClelland, Maier & Neustadt, L.L.P.

(57) ABSTRACT

A method of remotely controlling access to a resource comprising: transmitting a plurality of signals wherein each signal is transmitted using a different antenna from a plurality of antennas, detecting a received signal at a remote key, performing angle-of-arrival analysis on the received signal; and transmitting an authorisation message from the remote key if the received signal comprises a plurality of signal components with a predetermined characteristic.

17 Claims, 10 Drawing Sheets

SIGNAL DIRECTION DETECTION BASED VEHICLE REMOTE ENTRY CONTROL METHOD AND DEVICE

FIELD

Embodiments described herein relate generally to a method of remotely controlling access to a resource and corresponding devices for use in such remote key entry systems.

BACKGROUND

Over the past few years vehicle manufacturers have started to produce vehicles which use remote key entry. Remote key entry systems typically comprise a communications and control unit located within a vehicle and a number of remote keys which are authorised to unlock vehicle access provided these keys are within a range of the communications and control unit. In practice, the mechanism of unlocking vehicle access also comprises the exchange of messages by a short range communication link.

While the ability to remotely unlock a vehicle has enabled unrivalled convenience for an authorised party, it has also created a number of security vulnerabilities which could be exploited by an unauthorised party.

One way for an unauthorised party to gain access to a vehicle employing a remote key entry system is to use a relay attack. Relay attacks typically involves two radio transceivers which, in essence, extend the distance from the vehicle which the remote key of an authorised user can unlock vehicle access and/or functionality. By employing a relay attack in this way an unauthorised party is able to gain access to a user's vehicle.

In light of this a new approach to remote key entry is required which prevents unauthorised users from accessing a resource while still being easy and convenient for the user to use.

Arrangements of the present invention will be understood and appreciated more fully from the following detailed description, made by way of example only and taken in conjunction with drawings in which.

DETAILED DESCRIPTION

Figure 1A:
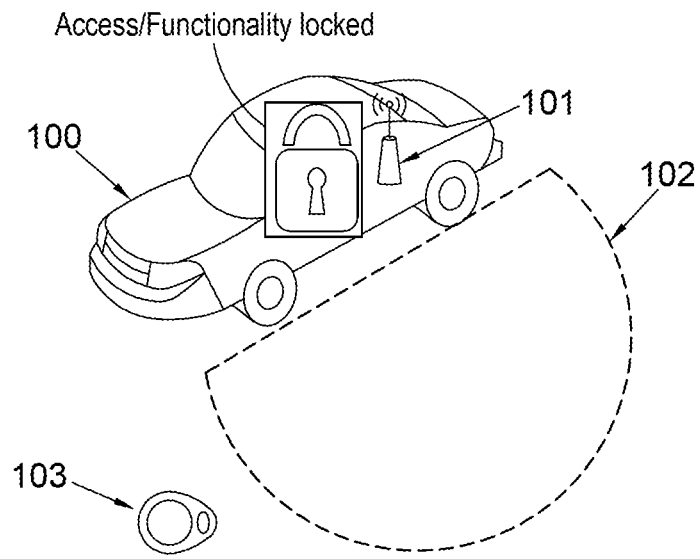
FIG. 1A shows a known remote key entry system in a locked state.

According to a first aspect of the invention there is provided a method of remotely controlling access to a resource. The method comprising transmitting a plurality of signals wherein each signal is transmitted using a different antenna from a plurality of antennas, detecting a received signal at a remote key, performing angle-of-arrival analysis on the received signal, and transmitting an authorisation message from the remote key if the received signal comprises a plurality of signal components with a predetermined characteristic.

Optionally, the received signal comprises a superposition of a plurality of signal components wherein each signal component is a signal transmitted by an antenna in the plurality of antennas.

Optionally, the plurality of signals are transmitted at the same frequency and are uncorrelated.

In an embodiment the method further comprises receiving the authorisation message and unlocking access to the resource if the remote key is authorised.

Optionally, the authorisation message comprises a sender identification number and unlocking access to the resource further comprises determining if the sender identification number is associated with an authorised user.

In an embodiment the received signal has the predetermined characteristic if it comprises a number of signal components separated by at least a predetermined angle wherein the number of signal components equals a number of signals in the transmitted plurality of signals.

In an embodiment performing angle-of-arrival analysis comprises determining an angle-of-arrival spectrum of the received signal for a predetermined range of angles and identifying peaks in the angle-of-arrival spectrum.

In a further embodiment the angle-of-arrival spectrum is a MUSIC spectrum.

In another embodiment the angle-of-arrival spectrum comprises a signal strength or power measurement for the received signal over the predetermined range of angles.

In an embodiment the received signal has the predetermined characteristic if the angle-of-arrival spectrum comprises: a number of peaks separated by at least a predetermined angle; wherein the number of peaks equals a number of signals in the plurality of transmitted signals.

In an embodiment the plurality of antennas comprises a first antenna and a second antenna; and transmitting a plurality of signals comprises transmitting a first signal comprising a request for authorisation message and a second signal comprising an interference signal.

Optionally: the request for authorisation message is configured to cause the remote key to transmit an authorisation message, the interference signal comprises random noise, the first signal and the second signal are transmitted with the same power and/or the first signal is a Bluetooth signal.

In an embodiment the predetermined angle is based on: a distance between the first antenna and the second antenna and a maximum range from which the resource can be unlocked.

In an embodiment the first antenna is located at a front of a vehicle and the second antenna is located at a rear of a vehicle.

According to a second aspect of the invention there is provided a remote key. The remote key comprises: a plurality of antennas, and a processor configured to: detect a received signal from the plurality of antennas, perform angle-of-arrival analysis on the received signal; and transmit an authorisation message via the plurality of antennas if the received signal comprises a plurality of signal components with a predetermined characteristic.

In an embodiment the plurality of antennas is configured to transmit and receive Bluetooth signals.

In an embodiment the authorisation message is configured to unlock access to a resource if the remote key is associated with an authorised user.

In an embodiment the received signal has the predetermined characteristic if it comprises a number of signal components separated by at least a predetermined angle wherein the number of signal components equals a number of signals transmitted by a control unit.

In an embodiment performing angle-of-arrival analysis comprises: determining an angle-of-arrival spectrum of the received signal for a predetermined range of angles; and identifying peaks in the angle-of-arrival spectrum.

In an embodiment the received signal has the predetermined characteristic if the angle-of-arrival spectrum comprises a number of peaks separated by at least a predetermined angle; wherein the number of peaks equals a number of signals transmitted by the control unit.

In an embodiment the number of peaks equals two.

In an embodiment the authorisation message comprises a sender identification number.

In an embodiment the number of peaks equals two and the predetermined angle is based on: a distance between a signal source of a first peak and a signal source of a second peak; and a maximum range from the first and second signal source from which the resource can be unlocked.

According to a third aspect of the invention there is provided a control unit for remote key entry. The control unit comprises a plurality of antennas, a control output configured to unlock access to a resource, and a processor configured to: transmit a plurality of signals via the plurality of antennas wherein each signal is transmitted using a different antenna from the plurality of antennas, receive an authorisation message via the plurality of antennas, and instruct the control output to unlock access to the resource if the authorisation message was transmitted by an authorised user.

In an embodiment the plurality of signals are transmitted at the same frequency.

In an embodiment the plurality of antennas comprises a first antenna and a second antenna and transmitting a plurality of signals comprises transmitting a first signal and a second signal.

In an embodiment the first signal comprises a request for authorisation message and the second signal is an interference signal.

Optionally, the interference signal comprises random noise, the first signal and the second signal are transmitted using the same power, the plurality of signals are uncorrelated and/or the first signal is a Bluetooth signal.

In an embodiment the first antenna is located at a front of a vehicle and the second antenna is located at a rear of a vehicle.

In an embodiment the authorisation message comprises a sender identification number and wherein the processor instructs the control output to unlock access to the resource if the sender identification number is associated with an authorised user.

In the following description the remote key entry system will be described with reference to it being used within a vehicle. However for the avoidance of doubt it is emphasized that the remote key entry control system could be used in any environment which requires secure remote key entry. For example, the methods and systems disclosed herein could also be used to control access to stock in a warehouse or a high-security area such as a laboratory.

FIG. 1A shows a known remote key entry system in a locked state. FIG. 1A shows a car 100 comprising a control unit 101. The control unit 101 is configured to transmit signals to, and receive signals from the remote key 103. If the remote key 103 is outside the range of the control unit 101, represented by the boundary 102, then the control unit 101 will not unlock vehicle access or functionality, irrespective of whether the remote key 103 is associated with an authorised user.

Figure 1B:
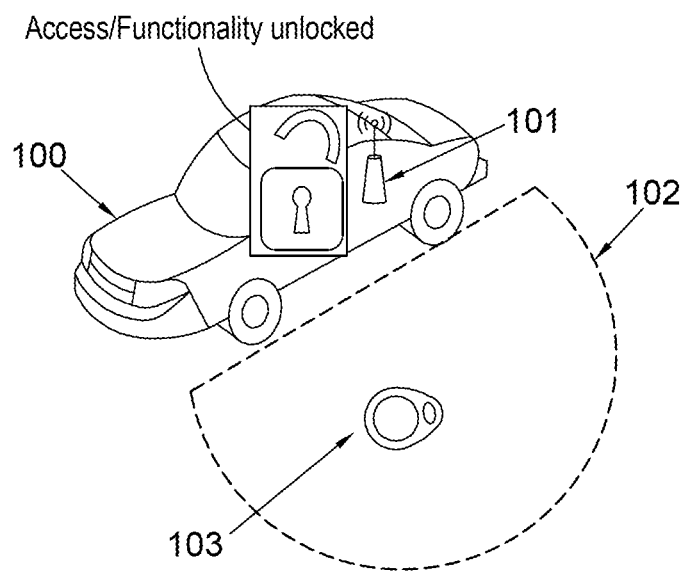
FIG. 1B shows a known remote key entry system in an unlocked state.

FIG. 1B shows a known remote key entry system in an unlocked state. FIG. 1B uses similar reference numerals as FIG. 1A to indicate similar components and as such a description of the repeated components will be omitted. Unlike FIG. 1A, in FIG. 1B the remote key 103 is within the boundary 102 of the control unit 101. Once the remote key 103 is within a range of the control unit 101 there is an exchange of authorisation messages between the remote key 103 and the control unit 101. An authorisation message typically contains data which enable the control unit 101 to determine whether the remote key is authorised to unlock vehicle access or functionality. The control unit 101 is configured to unlock access to, and/or the functionality of the vehicle 100 upon determining that the remote key 103 belongs to an authorised user.

The exchange of authorisation messages discussed above occurs automatically. As a result a user is not required to press a button on the remote key 103, or manually unlock the vehicle 100 in order to access the vehicle 100. While remote key entry is undoubtedly convenient for the user it can also be exploited by an unauthorised user to gain vehicle access using a relay attack.

Figure 2:
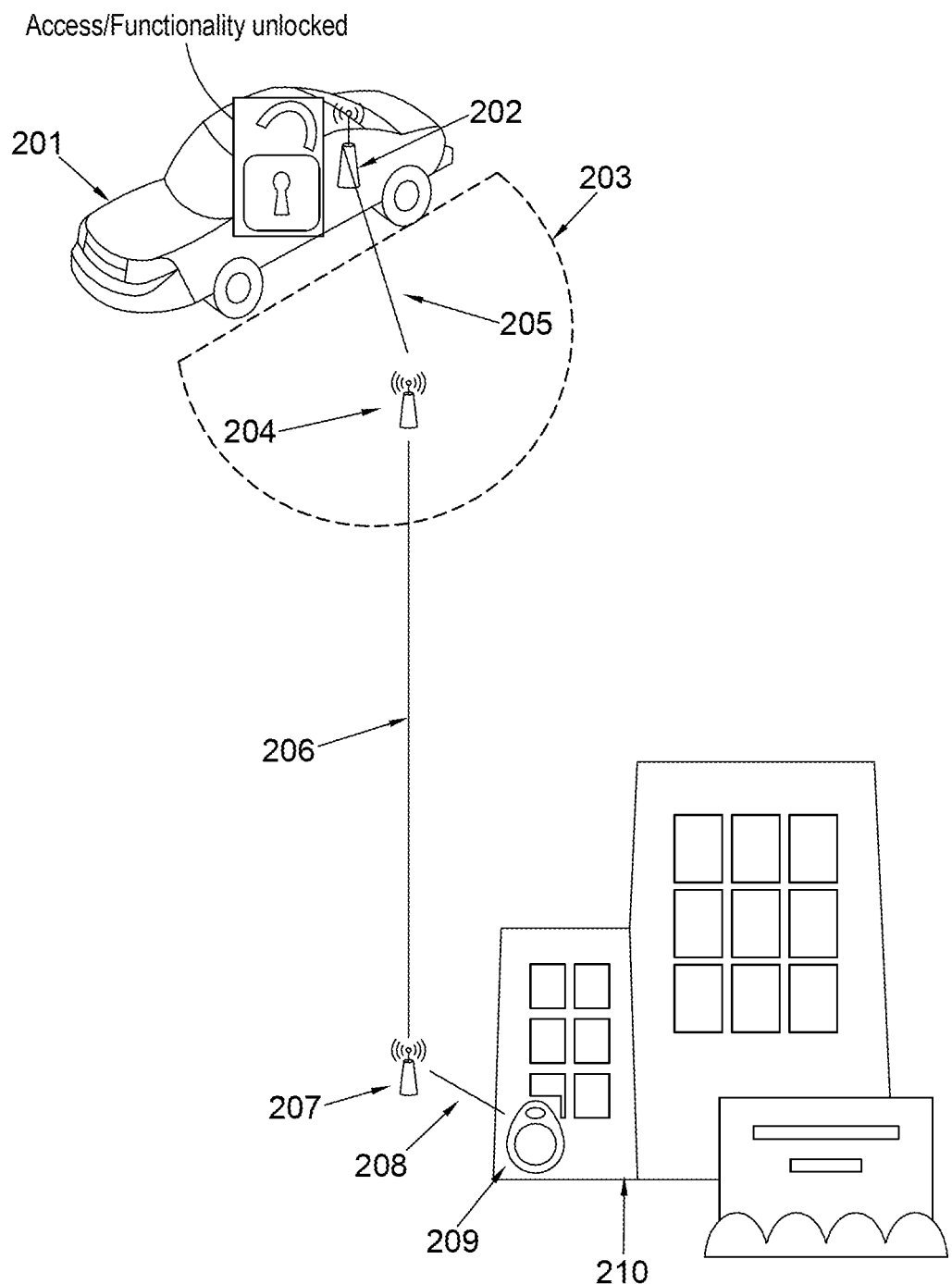
FIG. 2 shows a relay attack on a remote key entry system.

FIG. 2 shows a relay attack on a remote key entry system. FIG. 2 shows a vehicle 201 comprising a control unit 202. In FIG. 2 a remote key 209 of an authorised user is located within a building 210. The remote key 209 is outside the range of the control unit (represented by a boundary 203) and would therefore not routinely cause the control unit 202 to unlock access to the vehicle 201. FIG. 2 also shows a first transceiver 204 located within the range of the control unit 202 (i.e. within the boundary 203) as well as a second transceiver 207 located within the range of the remote key 209.

The first transceiver 204 is communicatively coupled to the control unit 202 via a first communication link 205 and a second transceiver 207 via a second communication link 206. The second transceiver 207 is communicatively coupled to the remote key 209 via a third communication link 208. At least the first communication link 205 and the third communication link 208 operate in the same frequency spectrum.

During a relay attack the first transceiver 204 and the second transceiver 207 replicate the signals transmitted by the control unit 202 and the remote key 209. In essence, the transceivers extend the range of the remote key 209 and the control unit 202 such that the control unit 202 perceives the first transceiver 204 to be the remote key 209 and the remote key 209 perceives the second transceiver 207 to be the control unit 202.

This is achieved by the second communication link 206 "relaying" the signals received by the first and second transceivers. The first and second transceivers subsequently transmit any signals received via the second communication link 206. In effect, copying the transmissions and messages generated by the control unit 202 and the remote key 209. In this way an unauthorised party is able to trick the control unit 202 into unlocking access to the vehicle 201.

Figure 3:
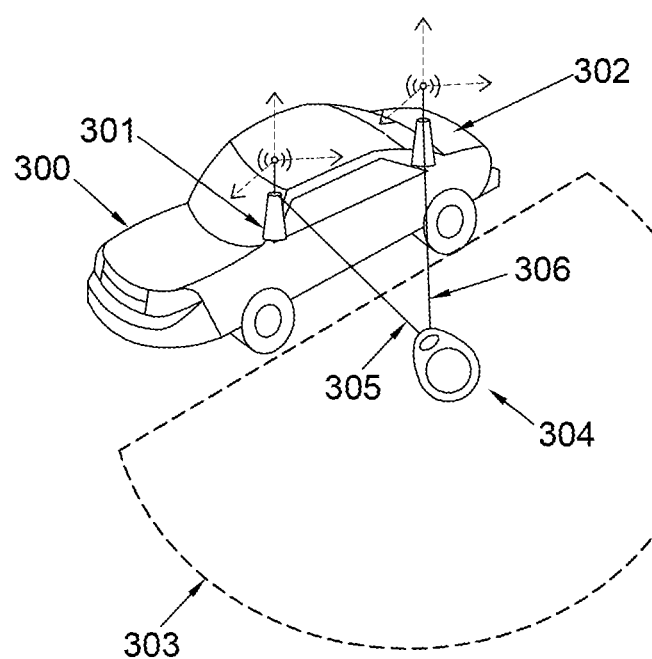
FIG. 3 shows a remote key entry system according to an embodiment.

FIG. 3 shows a remote key entry system according to an embodiment. FIG. 3 shows a vehicle 300 comprising a control unit (not shown) which is connected to a first transceiver 301 and a second transceiver 302. In FIG. 3 a remote key 304 receives a first signal transmitted by the first transceiver 301 via a first communication link 305. At the same time, and at the same frequency, the remote key 304 also receives a second signal transmitted by the second transceiver 302 via the second communication link 306.

In FIG. 3 the first and second signals are uncorrelated (i.e. have a correlation value of zero). As a result it is possible for the remote key 304 to determine whether the received signal comprises two distinct components which are separated a predetermined angle. By only transmitting an authorisation message from the remote key when two signal components are identified the remote key entry control system prevents relay attacks since the relay stations commonly used during an attack are unable to replicate the two signal components created by the transmissions of the first transceiver 301 and the second transceiver 302.

Before discussing the operation of the remote entry control system, the contents of the control unit and the remote key will be discussed in more detail.

Figure 4A:
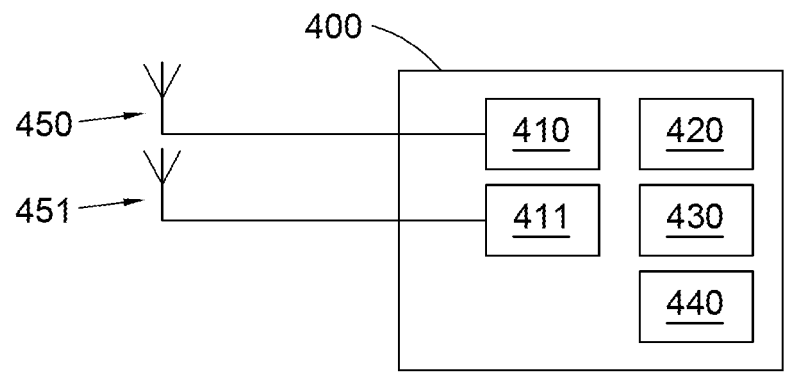
FIG. 4A shows an exemplary control unit according to an embodiment.

FIG. 4A shows an exemplary control unit according to an embodiment. The control unit comprises a first transceiver 410, a second transceiver 411, a processor 420, a non-volatile memory 430 and a control output port 440. The first transceiver 410 is communicatively coupled to a first antenna 450 and the second transceiver 411 is communicatively coupled to a second antenna 451. The first transceiver 410 and the second transceiver 411 are configured to transmit and receive radio signals at the same frequency. The processor 420 is coupled to non-volatile memory 430. Non-volatile memory 430 stores computer readable instructions that, when executed by the processor 420, cause the processor 420 to execute program steps that implement the methods described herein.

The processor 420 is also coupled to the control output port 440 which is configured to provide an indication of whether a remote key belonging to an authorised user is within a range of the first antenna 450 and the second antenna 451. In a further embodiment the control output port 440 transmits a control signal which causes a vehicle to be unlocked.

In another embodiment the first transceiver 410 and the second transceiver 411 are configured to transmit and receive short range radio signals at predetermined frequency. In a further embodiment the first transceiver 410 and the second transceiver 411 are compatible with Remote Keyless Entry standards and operate at a frequency in the range of 300 MHz to 500 MHz, or more specifically either: 315 MHz or 433.92 MHz. In a further embodiment the first transceiver 410 and the second transceiver 411 are configured to transmit and receive Bluetooth signals.

Whilst in the embodiments described above only two transceivers are described, it is emphasized that the control unit 400 may comprise more than two transceivers wherein each transceiver may comprise more than one antenna. Furthermore, although in FIG. 4A the plurality of antennae (450, 451) are shown to be situated outside of, but connected to, the first transceiver 410 and the second transceiver 411 respectively it will be appreciated that in other embodiments the first antenna 450 and the second antenna 451 are situated within the first transceiver 410 and the second transceiver 411 respectively.

The first antenna 450 is positioned a distance away from the second antenna 451. The distance between the first antenna 450 and the second antenna 451 is such that, at a predetermined distance from the antennas (i.e. a maximum desired range of the remote key entry system), the remote key observes a large angle-of-arrival difference between the signal transmitted by the first antenna 450 and the signal transmitted by the second antenna 451. Optionally, a large angle of arrival difference is an angle of arrival difference greater than 100 degrees.

Figure 4B:
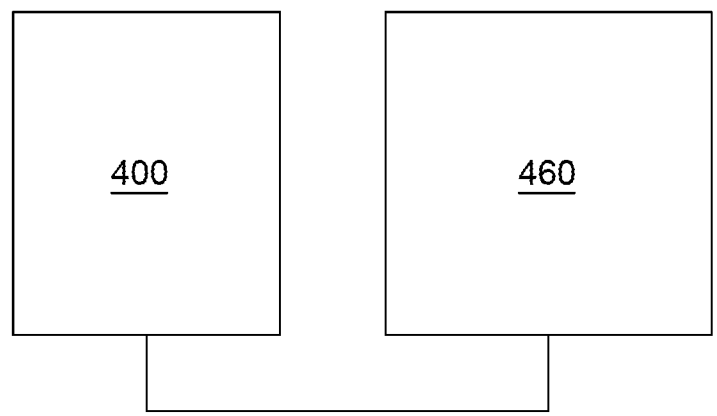
FIG. 4B shows a system comprising the control unit and a computing system according to an embodiment.

FIG. 4B shows a system comprising the control unit and a computing system according to an embodiment. In FIG. 4B the control unit 400 is communicatively coupled to the on-board computing system of a vehicle 460. In an embodiment the connection between the control unit 400 and the computing system 460 is established via the control output port 440 of the control unit 400.

In a further embodiment the control unit 400 and the computing system 460 are part of a different system which makes use of remote keyless entry. Including, but not limited to: remote key entry control in a warehouse, school, office or house.

Figure 5:
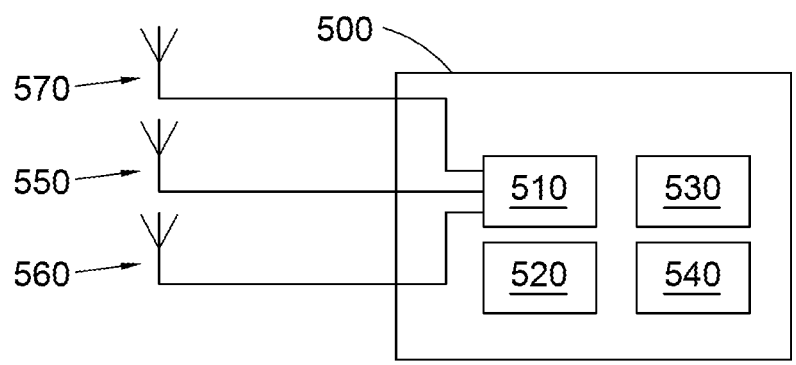
FIG. 5 shows a remote key according to an embodiment.

FIG. 5 shows a remote key according to an embodiment. The remote key 500 comprises an RF input/output port 510, a processor 520, a non-volatile memory 530 and a power supply 540. The RF input/output port 510 is communicatively connected to a first antenna 550 a second antenna 560, and a third antenna 570. The processor 520 is communicatively coupled to non-volatile memory 530. Non-volatile memory 530 stores computer readable instructions that, when executed by the processor 520, cause the processor 520 to execute program steps that implement the functionality of a remote key according to the methods described herein. The remote key 500 is configured to transmit and receive radio frequency signals via the RF input/output port 510 and the antennas 550, 560 and 570. Optionally the remote key transmits signals using all of the antennas (i.e. the first antenna 550, the second antenna 560 and the third antenna 570). In a further embodiment the remote key uses a single antenna from the plurality of antennas to transmit a radio frequency signal.

In FIG. 5 three antennas are shown since the remote key is configured to distinguish between two signal directions. Accordingly, the remote key may comprise more than three antennas in order to distinguish between more than two signal directions.

In one embodiment the processor 520 and the non-volatile memory 530 are contained within the same physical device such as a Peripheral Interface Controller (PIC). In a further embodiment the remote key 500 is integrated within a mobile phone such that access to the processor 520 and the non-volatile memory 530 are controlled by the mobile phone's operating system. In a further embodiment the remote key 500 is realised as a mobile phone application executing on a mobile phone.

Figure 6:
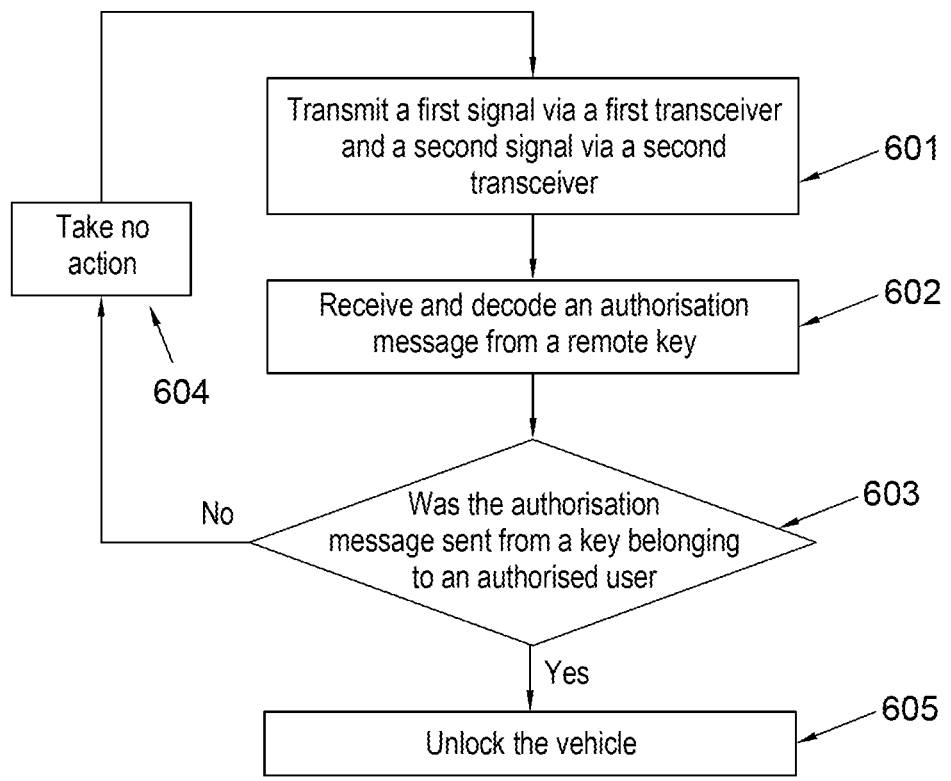
FIG. 6 shows a method of operating a control unit according to an embodiment.

FIG. 6 shows a method of operating a control unit according to an embodiment. In step 601 the control unit transmits a first signal via a first transceiver, and at the same time transmits a second signal via a second transceiver. Since the first transceiver and the second transceiver are configured to transmit signals at the same frequency, the first and second signals will be at the same frequency.

The first transceiver is configured to transmit a request for authorisation message to the remote key. The request for authorisation message prompts the remote key to transmit an authorisation message back to the control unit. In an embodiment the authorisation message comprises a 'sender ID' which can be used to determine whether the authorisation message was transmitted by a remote key belonging to an authorised user.

The second transceiver is configured to transmit an interference signal, at the same time, and at the same frequency as the first transceiver. The interference signal could be any signal as long as the interference signal is uncorrelated with the signal transmitted by the first transceiver (i.e. the result of a correlation between the signal transmitted by the first transceiver and the signal transmitted by the second transceiver is zero). Optionally the interference signal is characterised by random noise.

Optionally, the power of the signal transmitted by the second transceiver is controlled such that it is equal to the power of the signal transmitted by the first transceiver.

The operation of the remote key will be discussed in more detail in relation to FIG. 7 however upon detecting a signal comprising components from the first and second transceivers the remote key determines whether the characteristics of the detected signal fulfills a predetermined requirement (e.g. a number of distinct signal components and a predetermined angular separation between the components). If the predetermined requirement is fulfilled the remote key transmits an authorisation message.

In step 602 the control unit receives an authorisation message from the remote key and decodes the message in order to determine its contents. In one embodiment the authorisation message transmitted by the remote key is received by the first transceiver. In an alternative embodiment the authorisation message transmitted by the remote key is received by the second transceiver. In yet another embodiment the authorisation message is generated based on signals received by the first and second transceivers.

In step 603 it is determined whether the received authorisation message was sent by a remote key belonging to an authorised user. As discussed above, one way of determining this is to compare the 'sender ID' received in the authorisation message against a list of authorised 'sender IDs'.

If the authorisation message was sent by a remote key belonging to an authorised user then vehicle access and/or functionality is unlocked as shown in step 605. If the authorisation message was not sent from a remote key belonging to an authorised user then the control unit takes no action as shown in step 604.

In a further embodiment it is not necessary to make the determination shown in step 603 before the vehicle is unlocked. Instead, the act of receiving an authorisation message in step 602 is sufficient of itself to cause the control unit to unlock vehicle access and/or functionality.

Figure 7:
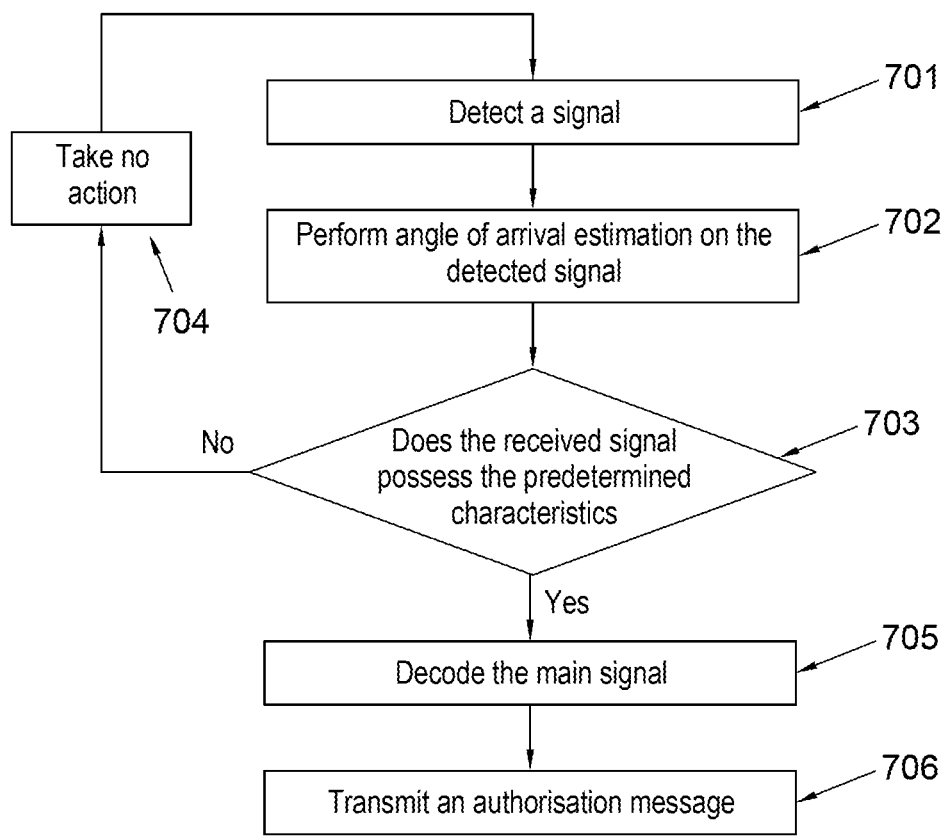
FIG. 7 shows a method of operating a remote key according to one embodiment.

FIG. 7 shows a method of operating a remote key according to one embodiment. In step 701 the remote key detects a signal. The remote key takes multiple samples and performs angle-of-arrival analysis on the detected signal in step 702. In step 703 the remote key determines whether the received signal possess a predetermined characteristics. The various possible characteristics will be discussed in more detail below however an exemplary characteristic is that the received signal must comprise two components separated by an azimuth angle ø.

If the detected signal does possess the required characteristics (i.e. the signal comprises two components separated the azimuth angle ø) the method will proceed to step 705. In step 705 a component of the detected signal corresponding to the signal transmitted by the first transceiver is processed and decoded. If the first component is a request for authorisation message the remote key transmits an authorisation message as shown in step 706.

The second component of the detected signal is disregarded by the remote key since it is used as a friendly interferer only and is not used to convey information from the control unit.

In an embodiment the remote key detects a request for authorisation message in the detected signal by observing both components and separating the request for authorisation message from the noise.

If, in step 703, the remote key determines that the detected signal does not possess the predetermined characteristics then the method takes no action as shown in step 704.

As discussed above, in step 702 the method performs angle of arrival analysis on the detected signal. Since the control unit transmits two signals which are uncorrelated it is possible to determine the angle-of-arrival at the remote key for each of these components using a low complexity algorithm. One example algorithm is the MUSIC algorithm as detailed in U.S. non-provisional patent application Ser. No. 15/938,642 which is incorporated herein by reference. In this technique multiple antenna elements are used to calculate the direction of arrival for a signal.

Figure 8A:
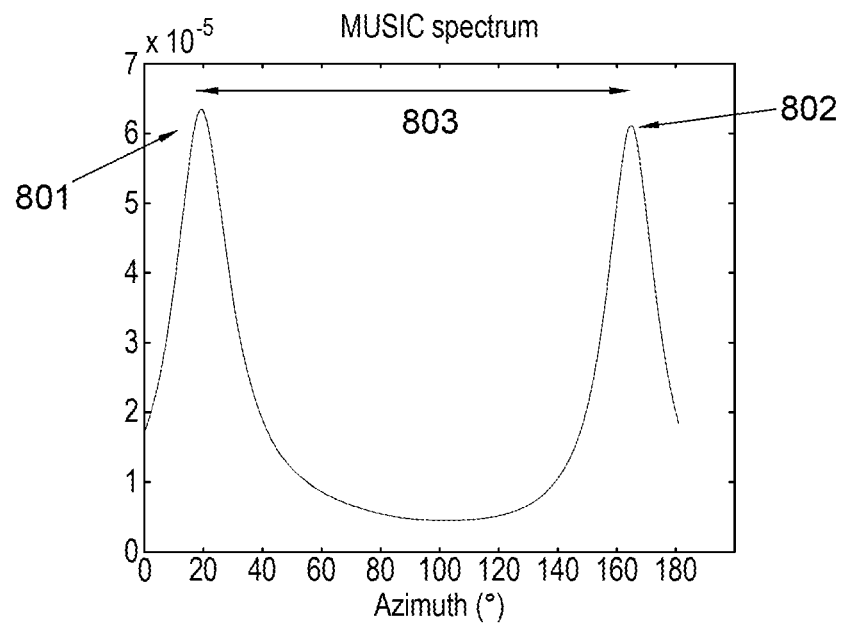
FIG. 8A shows a MUSIC spectrum for a remote key in line-of-sight of two signal sources.

FIG. 8A shows a MUSIC spectrum for a remote key in line-of-sight of two signal sources. FIG. 8A shows a first peak 801 located at a first azimuth angle and a second peak 802 located at a second azimuth angle. The first peak and the second peak are separated by an angular difference 803.

A peak in the MUSIC spectrum is defined according to the peak detection algorithm being used. For example, the peak detection algorithm may define a peak as an inversion point (i.e. a point where the gradient of the signal changes sign from positive to negative) that is a predetermined number of standard deviations away from the moving mean. Optionally the predetermined number of standard deviations is set by a manufacturer and stored in the memory of the remote key.

Where a remote key is within a line-of-sight of the first and second transceivers the resulting MUSIC spectrum will be similar to FIG. 8A (i.e. two clearly defined peaks relative to a low signal strength for the angular values surrounding the peaks).

When the remote key determines whether the received signal possess a predetermined characteristic in step 703 of FIG. 7 it first determines the number of peaks in the MUSIC spectrum using a peak detection algorithm since the number of peaks in the MUSIC spectrum is indicative of the number of signal components in the detected signal.

After determining the number of peaks in the MUSIC spectrum the remote key calculates the angular separation (i.e. the difference between the azimuth angles of these two peaks) and determines whether this angular difference is equal to, or greater than, a predetermined threshold.

Figure 8B:
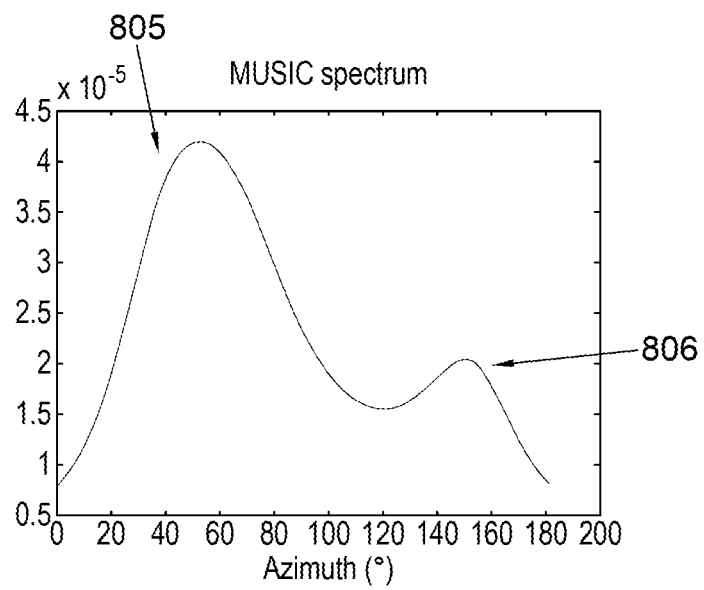
FIG. 8B shows a MUSIC spectrum at a remote key in a system comprising a single signal source and multipath interference.

FIG. 8B shows a MUSIC spectrum at a remote key in a system comprising a single signal source and multipath interference. FIG. 8B shows a first peak 805 and a multipath component 806. In FIG. 8B the multipath component 806 is not defined as a peak by the peak detection algorithm. As a result the MUSIC spectrum shown in FIG. 8B only contains one peak and therefore does not possess the predetermined characteristic (i.e. two signal components separated by at least a predetermined azimuth angle).

As will be discussed in more detail below, the MUSIC spectrum shown in FIG. 8B is also similar to the angle-of-arrival spectrum obtained during a relay attack since common-place attack equipment only uses a single signal transmitter in keeping with the example of FIG. 8B.

Although in the examples discussed above a MUSIC spectrum and a peak detection algorithm are used to identify the predetermined characteristic (i.e. two signals separated by a predetermined angle), it is emphasized that other techniques could also be used provided they are capable of identifying and determining an angle of arrival for the different signal components in the detected signal.

Accordingly, in an embodiment the remote key identifies a plurality of components in a signal detected by the remote key and determines the angular difference between the identified components. If the angular difference is large (i.e. greater than a predetermined threshold) then the remote key transmits an authorisation message.

Figure 9A:
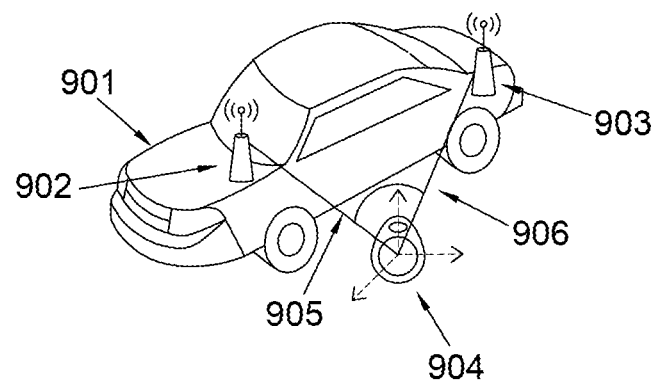
FIG. 9A shows a remote key entry system according to an embodiment wherein the remote key is in a first position.

FIG. 9A shows a remote key entry system according to an embodiment wherein the remote key is in a first position. FIG. 9A shows a vehicle 901 with a control unit comprising a first transceiver 902 and a second transceiver 903. In FIG. 9A a remote key 904 detects a signal comprising a first component 905 and a second component 906. Since the remote key 904 is within a line-of-sight of the vehicle 901 and there is no multi-path there will be two cleanly defined peaks in the MUSIC spectrum as shown in FIG. 8A. Furthermore, since the remote key 904 is close to the vehicle the angular difference between the first component 905 and the second component 906 reaches a maximum value, thereby exceeding the predetermined threshold required for the remote key 904 to transmit an authorisation message to the vehicle 901.

Figure 9B:
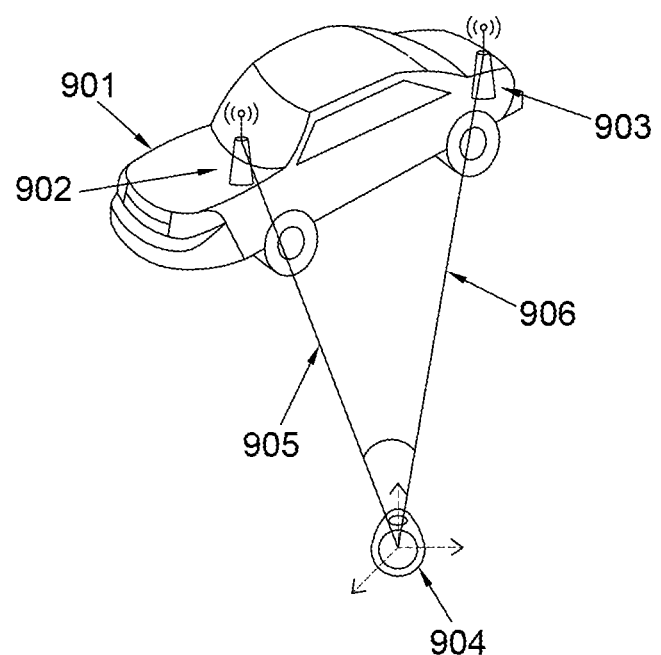
FIG. 9B shows a remote key entry system according to an embodiment wherein the remote key is in a second position.

FIG. 9B shows a remote key entry system according to an embodiment wherein the remote key is in a second position. FIG. 9B uses similar reference numerals to FIG. 9A to show similar components. In contrast to FIG. 9A, in FIG. 9B the remote key 904 is located further away from the vehicle 901. As a result, the angular difference between the first component 905 transmitted by the first transceiver 902 and the second component 906 transmitted by the second transceiver 903 is smaller. As the remote key 904 moves further away from the vehicle 901 the angular difference becomes smaller than the predetermined threshold required for the remote key 904 to transmit an authorisation message to the vehicle 901.

As a result, even though the system shown in FIG. 9B comprises two line-of-sight signal sources, and will therefore produce a MUSIC spectrum similar to FIG. 8A, the difference between the peaks is too small to cause the remote key to transmit an authorisation message. In this way the systems and methods described herein also limit the range from which the remote key 904 can unlock the vehicle 901.

Figure 10:
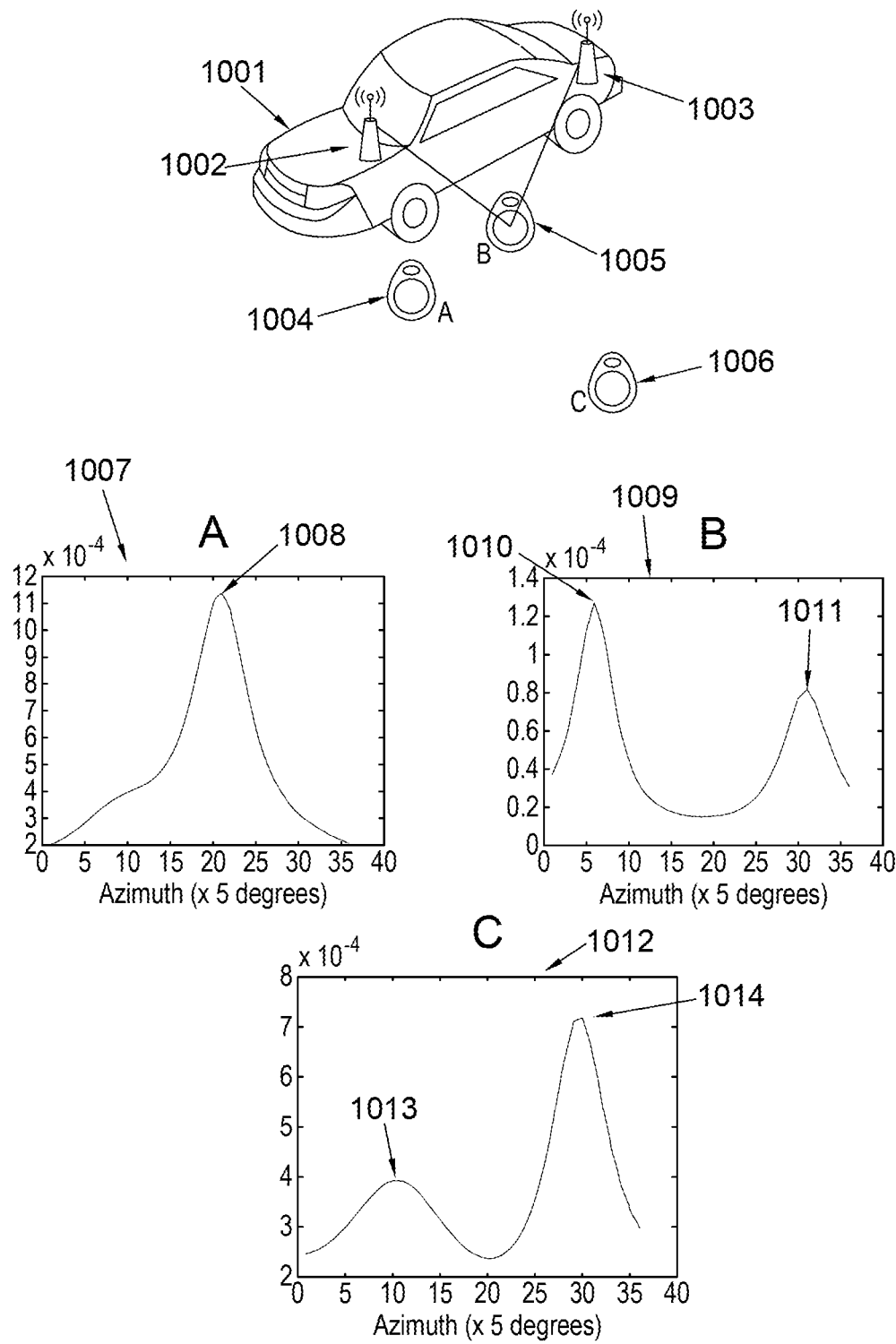
FIG. 10 shows a MUSIC spectrum at a remote key for a plurality of positions.

FIG. 10 shows a MUSIC spectrum at a remote key for a plurality of positions. FIG. 10 shows a vehicle 1001 comprising a control unit (not shown) which is configured to operate in accordance with an embodiment discussed above. The control unit comprises a first transceiver 1002 and a second transceiver 1003. FIG. 10 also shows a remote key at a first position 1004, a remote key at a second position 1005 and a remote key at a third position 1006.

When the remote key at the first position 1004 performs angle-of-arrival analysis on the detected signal a first MUSIC spectrum 1007 is obtained. The first MUSIC spectrum 1007 comprises a first peak 1008. In the MUSIC spectrum 1007, the first peak 1008 corresponds to a signal received from the first transceiver 1002. Since the remote key at the first position 1004 is at the front of the vehicle 1001 the signal from the first transceiver 1002 is much stronger than the signal from the second transceiver 1003. Consequently the signal from the second transceiver 1003 cannot be distinguished and the MUSIC spectrum 1007 only contains one observable peak (indicating the presence of a single signal component).

In one embodiment the observable range of azimuth angles at the remote key is limited by the physical hardware of the remote key (e.g. by the radiation pattern and the directivity of the first, second and third antennae (550, 560 and 570)). In a further embodiment the observable range of azimuth angles is limited by the angle-of-arrival estimation process, for example by only analysing a signal for components over a predetermined angular range.

When the remote key at the second position 1005 performs angle-of-arrival analysis on the detected signal a second MUSIC spectrum 1009 is obtained. The second MUSIC spectrum 1009 comprises a first peak 1010 and a second peak 1011 (indicating the presence of a first signal component and a second signal component). The second MUSIC spectrum comprises two clean peaks (indicating two strong signals), separated by a large angle (i.e. greater than the predetermined angle). In accordance with the embodiments discussed above, since two clean signal components separated by a predetermined angle have been identified, the remote key transmits an authorisation message to the vehicle 1001, thereby enabling functionality and access to the vehicle 1001 to be unlocked.

When the remote key at the third position 1006 performs angle-of-arrival analysis on the detected signal a third MUSIC spectrum 1012 is obtained. The third angle-of-arrival spectrum 1012 comprises a first component 1013 and a second component 1014. Since the remote key is located further away from the vehicle 1001 the propagation of the signals transmitted by the first and second transceiver is more complicated and multipath effects are introduced. As a result the third MUSIC spectrum 1012 does not contain any significant peaks (indicating the absence of any strong signal components) and therefore does not possess the predetermined characteristics, namely two signal components separated by at least a predetermined angular difference.

The first, second and third angle-of-arrival spectrums (1007, 1009, 1012) were generated from experimental data. The experiments were conducted in a multi-path rich environment (specifically, a small room) in order to replicate environments where multi-path signals are prevalent for example in a multi-storey car park. In the experimental results of FIG. 10 the first transceiver 1002 was configured to transmit and receive 2.4 GHz Bluetooth signals. The second transceiver 1003 was configured to continuously transmit a random signal at the same frequency and for the same duration as the signal transmitted by the first transceiver 1002. In each position (i.e. the first position 1004, the second position 1005 and the third position 1006) the remote key was within a line-of-sight of both the first transceiver 1002 and the second transceiver 1003.

Figure 11:
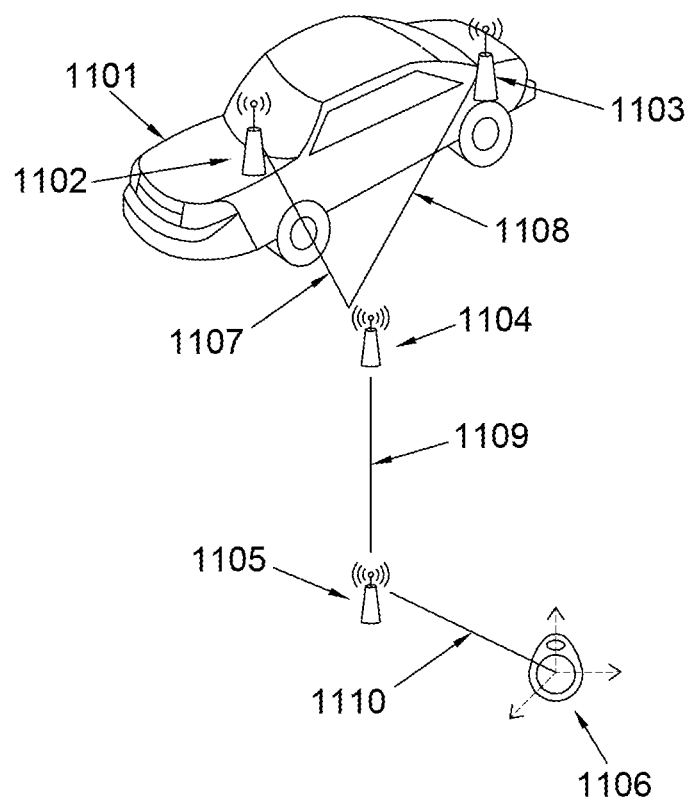
FIG. 11 shows an attempted relay attack using the remote key entry system according to an embodiment.

FIG. 11 shows an attempted relay attack using the remote key entry system according to an embodiment. FIG. 11 shows a vehicle 1101 comprising a control unit (not shown) which is configured according to an embodiment discussed above. The control unit comprises a first transceiver 1102 and a second transceiver 1103. FIG. 11 also shows a first relay station 1104 communicatively coupled via a relay link 1109 to a second relay station 1105. The second relay station 1105 is located with a range of a remote key 1006 such that a relayed signal 1110 transmitted by the second relay station 1105 is received by the remote key 1106.

In FIG. 11 the remote key 1106 is position such that it is not within a communicative range of the vehicle 1101. As a result the remote key 1106 would not ordinarily be able to unlock access to, or the functionality of, the vehicle 1101.

In accordance with the embodiments discussed above, the control unit transmits a first signal via the first transceiver 1102 which is capable of causing the remote key to transmit an authorisation message. At the same time and at the same frequency the second transceiver 1103 transmits an interference signal. The transmission of the first transceiver 1107 and the transmission of the second transceiver 1108 are both present as components in the signal received by the first relay station 1104. The first relay station 1104 communicates the received signal via the relay link 1109 to the second relay station 1105. The second relay station 1105 subsequently transmits the signal received at the first relay station 1104.

Since the second relay station 1105 transmits the relayed signal from a single location (optionally using a single antenna) the relayed signal 1110 only contains power at a single azimuth angle. As a result, when the remote key 1106 performs angle-of-arrival analysis it will only observe a single peak in the direction of the second relay station 1105 and therefore will not transmit an authorisation message.

By only transmitting an authorisation message when the remote key identifies a second signal source separated from the first signal source by an angular difference the remote key entry system discussed herein prevents relay attacks that use commonly available equipment.

Advantageously, the systems and methods disclosed herein do not require changes to the existing communication protocols. Furthermore, since angle-of-arrival analysis is not limited to a specific frequency band, the methods and devices for secure remote key entry discussed herein can be applied to different remote entry communication systems. Additionally the systems and methods discussed herein could also be combined with other signal characteristic based systems or movement detection based systems in order to achieve an even more secure remote key entry system.

Whilst above reference was made to the simultaneous transmission of the signals used for angle of arrival determination upon receipt by the key it will be appreciated that it is not essential for these signals to be transmitted simultaneously. Instead the signals may be transmitted substantially simultaneously or even consecutively as long as the signals are transmitted using transmission timing that does not negatively affect the angle of arrival determination by the key. In practice this will mean that the signals are transmitted using a timing that makes movement of the key between the receipt of the two signals beyond the precision of the angle of arrival determination method unlikely.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of remotely controlling access to a resource, the method comprising:
    transmitting a first signal including a request for authorization message via a first antenna;
    transmitting a second signal including an interference signal uncorrelated with the first signal via a second antenna different from the first antenna;
    receiving the first signal and the second signal at a remote key;
    performing angle-of-arrival analysis on the first signal received;
    performing angle-of-arrival analysis on the second signal received; and
    transmitting the authorization message from the remote key when the first signal received and the second signal received comprise a plurality of signal components separated by a predetermined angle more than a threshold.

2. The method according to claim 1, wherein the method further comprises receiving the authorization message and unlocking access to the resource when the remote key is authorized.

3. The method according to claim 2, wherein
    a number of the signal components equals a number of signals in transmitted signals.

4. The method according to claim 3, wherein the performing angle-of-arrival analysis comprises:
    determining an angle-of-arrival spectrum of the first signal received and the second signal received for a predetermined range of angles; and
    identifying peaks in the angle-of-arrival spectrum.

5. The method according to claim 4, wherein the first signal received and the second signal received have the predetermined angle when the angle-of-arrival spectrum comprises:
    a number of peaks separated by at least the predetermined angle; wherein
    the number of peaks equals the number of signals in the transmitted signals.

6. The method according to claim 1, wherein the predetermined angle is based on:
    a distance between the first antenna and the second antenna; and
    a maximum range from which the resource is unlocked.

7. The method according to claim 6, wherein the first antenna is located at a front of a vehicle and the second antenna is located at a rear of the vehicle.

8. A remote key comprising:
    a plurality of antennas; and
    a processor configured to:
        receive a first signal including a request for an authorization message via a first antenna;
        receive a second signal including an interference signal uncorrelated with the first signal via a second antenna different from the first antenna;
        perform angle-of-arrival analysis on the first signal received;
        perform angle-of-arrival analysis on the second signal received; and
        transmit the authorization message when the first signal received and the second signal received comprise a plurality of signal components separated by a predetermined angle more than a threshold.

9. The remote key according to claim 8, wherein the authorization message is configured to unlock access to a resource when the remote key is associated with an authorized user.

10. The remote key according to claim 9, wherein
    a number of the signal components equals a number of signals transmitted by a control unit.

11. The remote key according to claim 10, wherein the performing angle-of-arrival analysis comprises:

determining an angle-of-arrival spectrum of the first signal received and the second signal received for a predetermined range of angles; and identifying peaks in the angle-of-arrival spectrum.

12. The remote key according to claim 11, wherein the first signal received and the second signal received have the predetermined angle when the angle-of-arrival spectrum comprises:

a number of peaks separated by at least the predetermined angle; wherein the number of peaks equals the number of signals transmitted by the control unit.

13. The remote key according to claim 12, wherein the authorization message comprises a sender identification number.

14. The remote key according to claim 13, wherein the number of peaks equals two and the predetermined angle is based on:

a distance between a first signal source of a first peak and a second signal source of a second peak; and a maximum range from the first signal source to the second signal source wherein the resource is unlocked from the maximum range.

15. A control unit for remote key entry comprising:

a first antenna and a second antenna;

a control output configured to unlock access to a resource; and a processor configured to:

transmit a first signal including a request for authorization message via the first antenna;

transmit a second signal including an interference signal uncorrelated with the first signal via the second antenna different from the first antenna;

receive the authorization message from a remote key when the remote key determines the first signal transmitted and the second signal transmitted comprise a plurality of signal components separated by a predetermined angle more than a threshold; and instruct the control output to unlock access to the resource when the authorization message was transmitted by an authorized user.

16. The control unit according to claim 15, wherein the first antenna is located at a front of a vehicle and the second antenna is located at a rear of the vehicle.

17. The control unit according to claim 16, wherein the authorization message comprises a sender identification number and wherein the processor instructs the control output to unlock access to the resource when the sender identification number is associated with an authorized user.

* * * * *